United States Patent [19]
Simkowski et al.

[11] Patent Number: 5,762,794
[45] Date of Patent: Jun. 9, 1998

[54] ARTICLE CONVEYOR HAVING FLUID CONTAINMENT

[75] Inventors: Donald J. Simkowski, Loveland; Thomas M. Ingraham, Fort Collins, both of Colo.

[73] Assignee: Goldco Industries, Inc., Loveland, Colo.

[21] Appl. No.: 519,983

[22] Filed: Aug. 28, 1995

[51] Int. Cl.$^6$ ................................................ B01D 33/00
[52] U.S. Cl. .................... 210/398; 210/400; 210/406; 198/689.1
[58] Field of Search .................. 198/689.1; 210/398, 210/400, 406, 783

[56] References Cited

U.S. PATENT DOCUMENTS

| | | |
|---|---|---|
| 3,311,238 | 3/1967 | Huff . |
| 3,603,448 | 9/1971 | Okano et al. . |
| 4,406,359 | 9/1983 | Cole et al. . |
| 5,209,841 | 5/1993 | Bratten . |
| 5,366,165 | 11/1994 | Jackman . |
| 5,524,356 | 6/1996 | Lutz . |

FOREIGN PATENT DOCUMENTS 385257  3/1988  Austria .

*Primary Examiner*—Robert Popovics
*Attorney, Agent, or Firm*—Robert E. Harris

[57] ABSTRACT

Article conveyor apparatus and method are disclosed having fluid containment, and particularly for conveying of articles such as cans having an oily liquid thereon when transported from a processing or forming station. The articles are mass transported along a predetermined path that is closed to the atmosphere except for infeed and discharge of articles, with the articles being transported by engagement with a moving belt having openings therein. The inlet of a chamber, otherwise closed to the atmosphere and having negative fluid pressure maintained therein during normal operation, is positioned adjacent to the belt so that the negative pressure maintains articles in contact with the belt during transport along the predetermined path regardless of path orientation and also draws fluid from the transported articles and belt into the chamber through the openings in the belt and the chamber inlet. The fluid, such as an air-liquid mixture that includes liquid not then gravity separated in the chamber from the air, is discharged from the chamber to a pressure source that also provides positive pressure through a conduit to a perforated top plate positioned at the predetermined path.

20 Claims, 4 Drawing Sheets

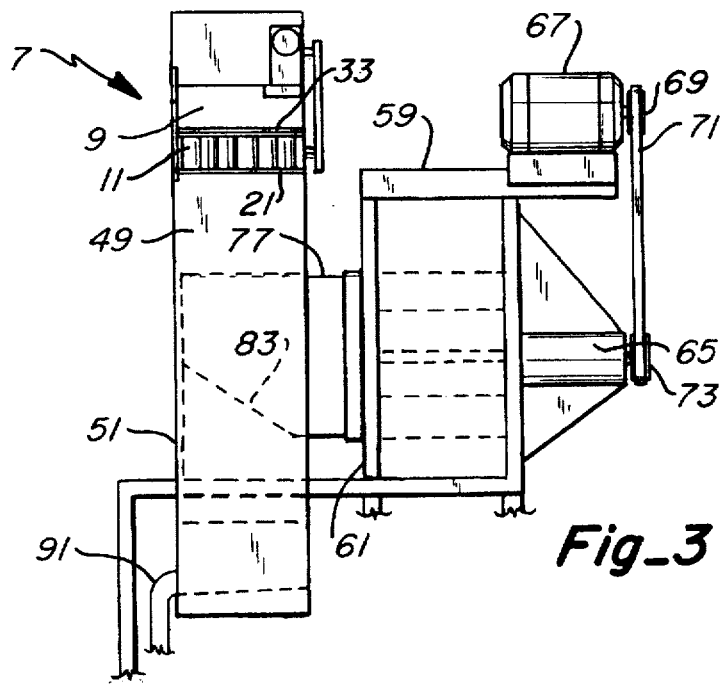
Fig_3
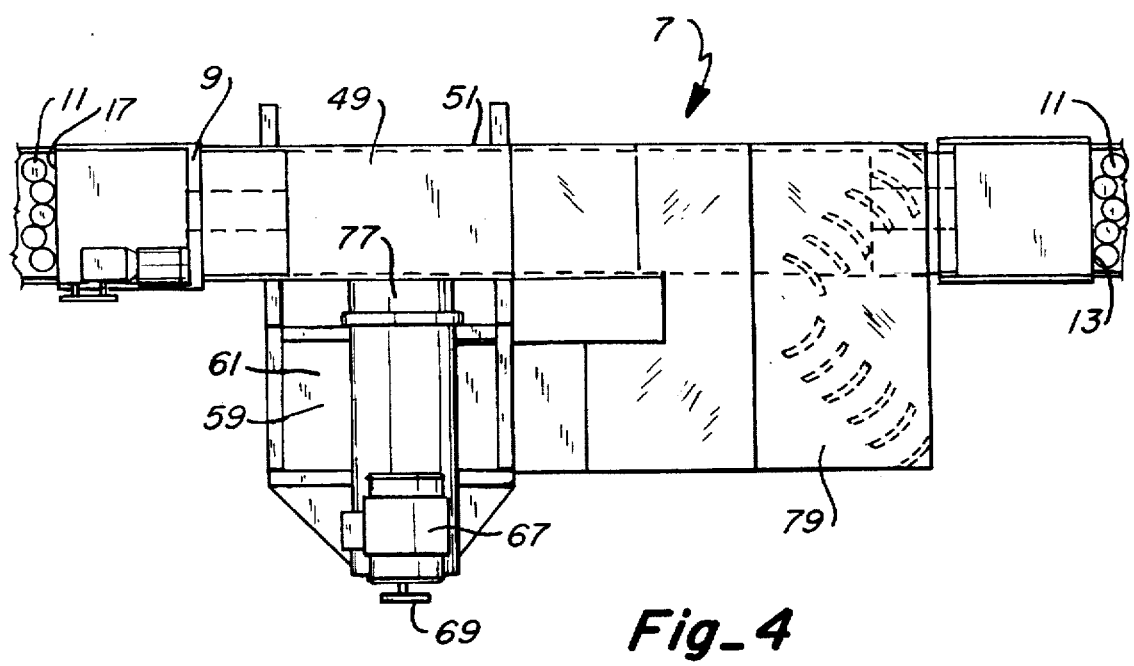
Fig_4

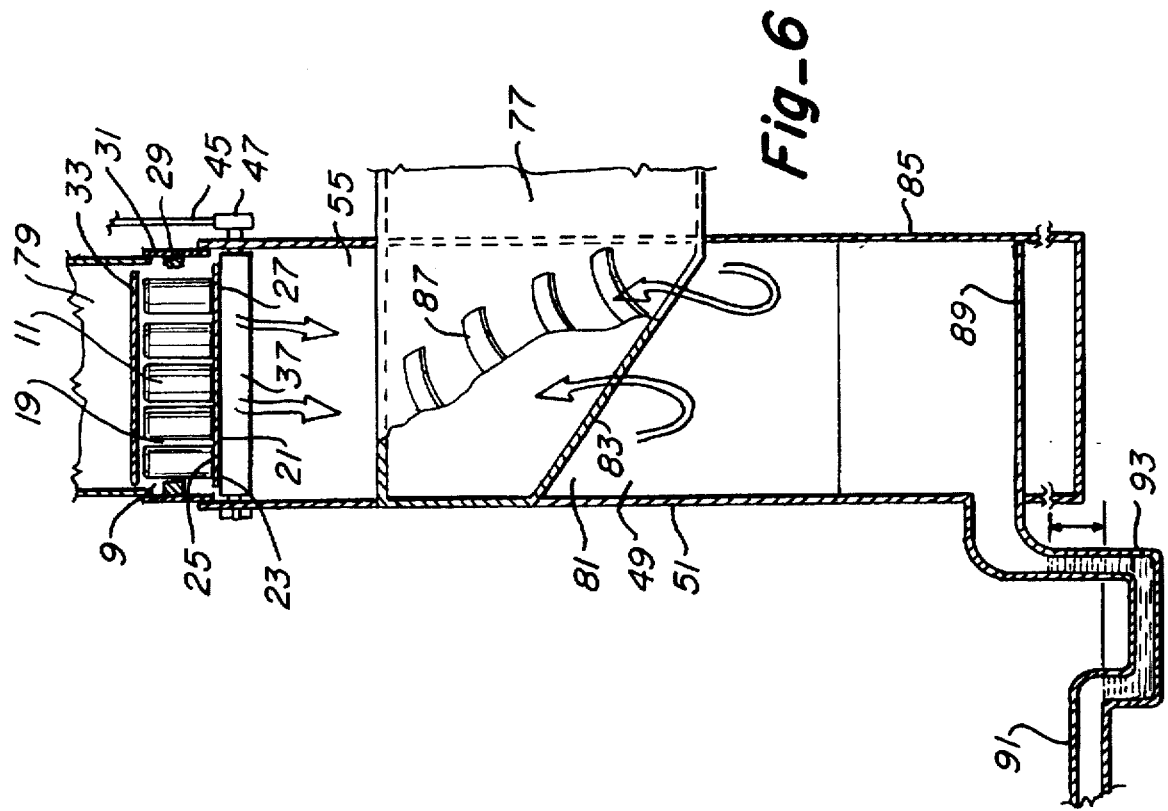
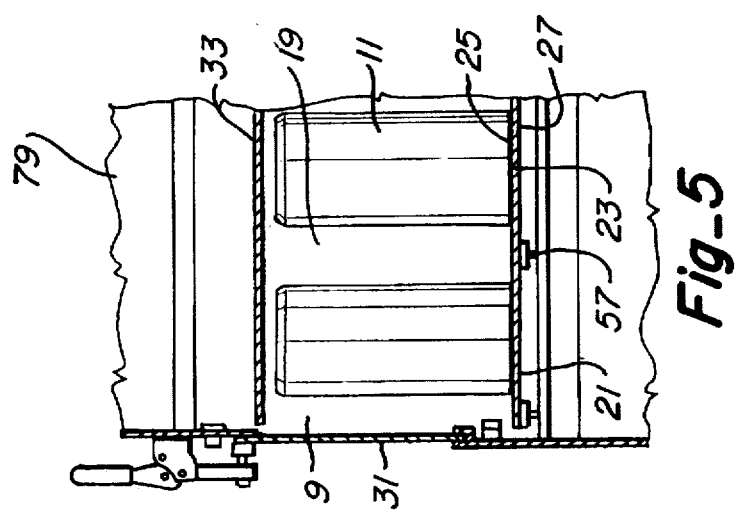

5,762,794

ARTICLE CONVEYOR HAVING FLUID CONTAINMENT

FIELD OF THE INVENTION

This invention relates to article conveyor apparatus and method, and, more particularly, relates to article conveyor apparatus and method having fluid containment.

BACKGROUND OF THE INVENTION

It is now well known that articles, such as cans, may be effectively mass transported from one position to another using various forms of conveying equipment, including moving belts or chains and the like to move the articles along a generally horizontal path.

Mass transport along a path that is angled with respect to horizontal, such as a path having an incline and/or article inversion, for example, utilizing conveying equipment has also been heretofore suggested and/or utilized, and normally such conveying equipment has included some form of restraining unit, such as, for example, using negative pressure and/or positive holding structure (see, for example, U.S. Pat. Nos. 3,603,448 to Okano et al. and 4,406,359 to Cole et al.) to assure that the somewhat unstable articles (cans) do not tip while being moved.

While presently known transport equipment can transport articles, such as cans, in mass and at high speeds, such as speeds in excess of two thousand cans per minute, as is now required to accommodate many can forming and/or processing operations, high speed operation has created, or at least accented, other problems including often severely limiting the amount of time allocable to specific steps which must be carried out during the overall operation.

In can forming and processing, for example, soluble oil is normally utilized at least during drawing, ironing and/or trimming of the cans, and the cans must also normally be washed, dried and transported between steps prior to required, or desired, additional processing. A problem can arise, however, in accomplishing all of the necessary, and/or desirable, steps in a short allocable time and in an environmentally acceptable manner to assure that at least certain fluids are not released to the atmosphere or environment.

In view of the foregoing, it can readily be appreciated that novel and/or improved structure and/or combining of processing steps, is advantageous, and sometimes necessary, in an overall operation, and, more particularly, that an essentially closed article conveying apparatus and method enabling environmentally safe transport of articles, such as cans, having fluid, such as oily liquid thereon, is both useful and advantageous.

SUMMARY OF THE INVENTION

This invention provides novel and/or improved apparatus and method for conveying articles, and, more particularly, to article conveyor apparatus and method having fluid containment that is particularly well suited for environmentally safe article conveyance of articles, such as cans, having fluid thereon, such as an oily liquid (including, for example, oil or a mixture of oil and another or other liquids such as water).

The articles are preferably mass transported along a predetermined path that is substantially closed to the atmosphere except for article infeed and discharge, with the articles preferably being transported along a belt having small openings therein relative to the size of the articles to be transported along the predetermined path (the belt may be, for example, a foraminous belt). Negative fluid pressure is established in a plenum, or chamber, that is substantially closed, or sealed, to the atmosphere except for having a portion, or inlet, open to the predetermined path, preferably through the openings, or apertures, in the belt, so that not only are the articles held in engagement with the belt during transport along the predetermined path (as is particularly advantageous in high speed operations and/or in moving the articles at an angle from horizontal to achieve, for example, different elevations and/or article inverting between article input and discharge), fluid (which can include, for example air and/or air liquid mixtures) from the articles and/or belt is also drawn into the chamber. Fluid in the chamber (including air and liquid not then gravity separated from the air and separately collected in the chamber) is discharged from the chamber through an otherwise closed conduit to a pressure source that also supplies positive fluid pressure through an otherwise closed return conduit to the predetermined article path to thus provide for fluid recirculation as a closed system.

It is therefore an object of this invention to provide novel article conveying apparatus and method.

It is another object of this invention to provide novel article conveying apparatus and method having fluid containment.

It is still another object of this invention to provide novel conveying apparatus and method that includes containment of fluid, such as air and/or liquid, to thereby enable environmentally safe conveyance of articles.

It is still another object of this invention to provide novel apparatus and method for containing fluid during transport of articles involving application of negative fluid pressure.

It is still another object of this invention to provide novel apparatus and method for containing fluid during mass transport of articles along a belt having openings therein using negative fluid pressure applied through openings in the belt.

It is still another object of this invention to provide novel apparatus and method for containing fluid during transport of the articles along a substantially closed path using a chamber having negative fluid pressure established therein to draw the fluid into the chamber.

It is still another object of this invention to provide novel apparatus and method for transporting articles along a predetermined article path and containing fluid drawn from the article path using a substantially closed system that includes a chamber adjacent to the article path and establishing negative pressure in the chamber by a pressure source that also supplies positive pressure to the article path.

It is still another object of this invention to provide novel apparatus and method for gravity separation of liquid from air during transport of articles using a substantially closed fluid containment system.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

3

Figure 1:
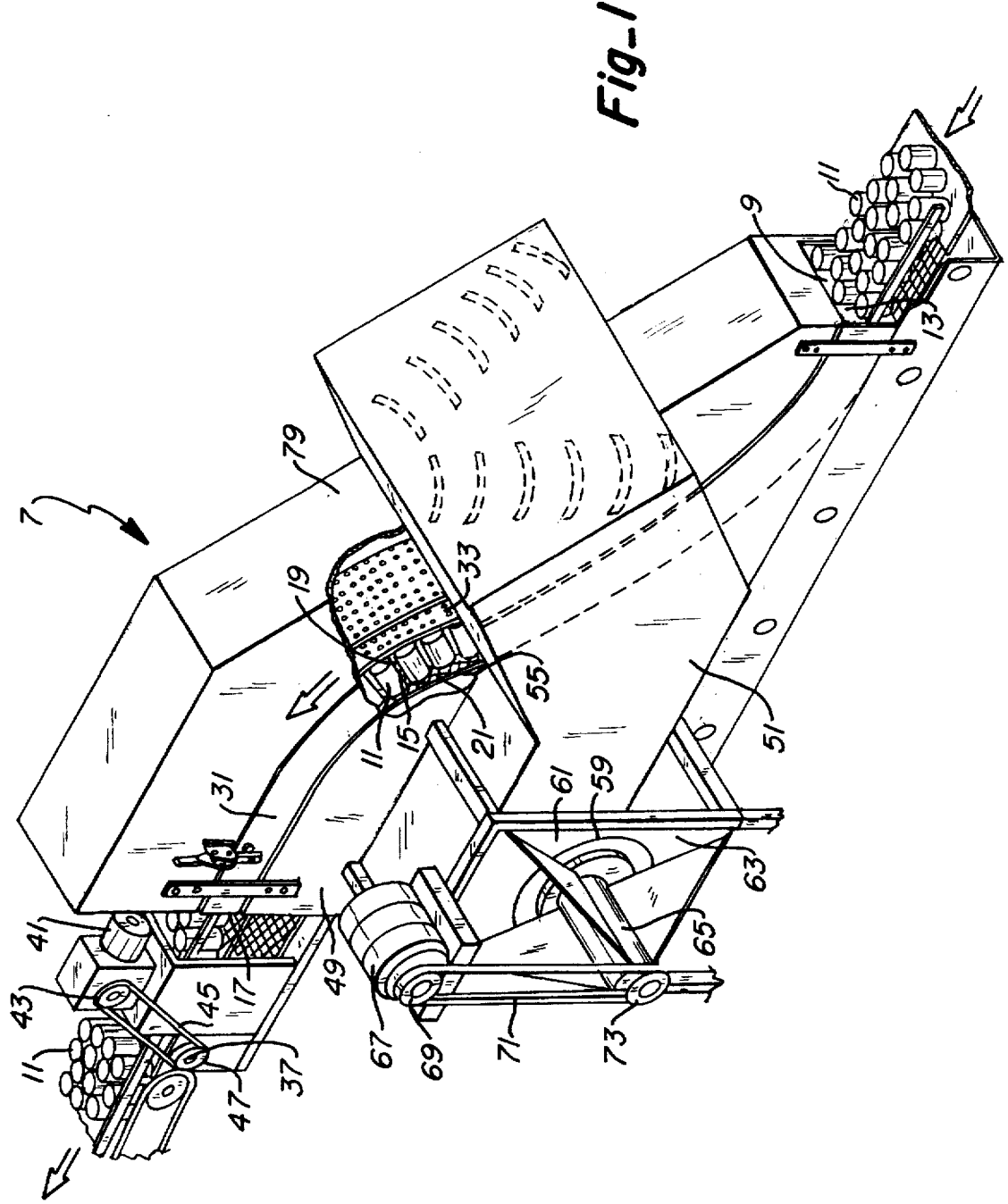
Figure 2:
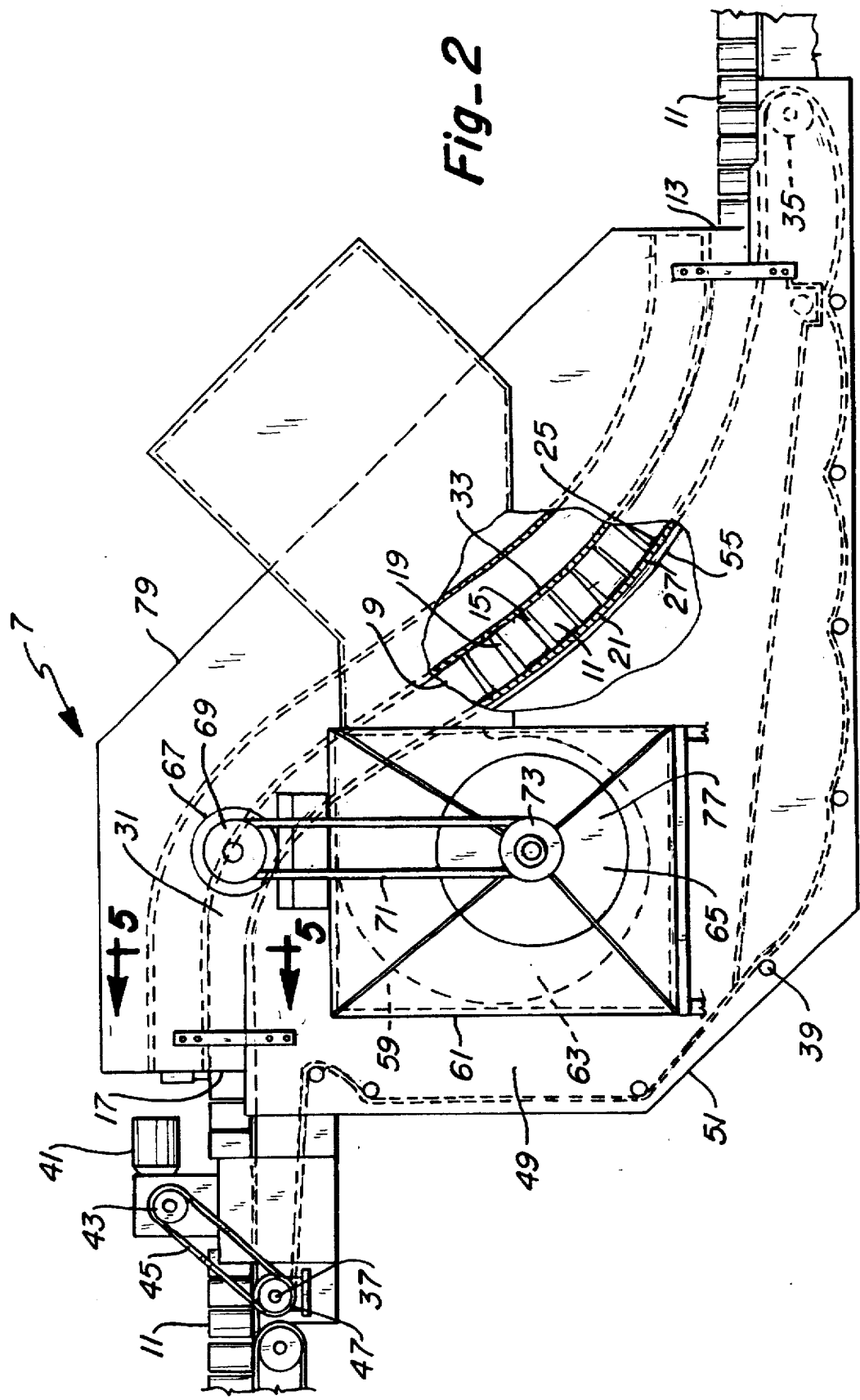

FIG. 1 is a perspective view of apparatus according to this invention for containment of fluid during transport of articles with transport of the articles being particularly shown in connection with article transport partially at an angle from horizontal;

FIG. 2 is a partially cut-away side view of the device shown in FIG. 1;

FIG. 3 is an end view of the device shown in FIG. 1;

FIG. 4 is a top view of the device shown in FIG. 1;

FIG. 5 is a partial section view taken through lines 5—5 of FIG. 2; and

FIG. 6 is a partially cut-away end sectional view of the chamber particularly illustrating containment of fluid, such as an air-liquid mixture, including drawing of fluid from the articles and belt into the chamber, and gravity separation of liquid from air while in the chamber.

DESCRIPTION OF THE INVENTION

Apparatus 7 according to this invention includes, as shown in FIGS. 1 through 6, conveyor, or conveying section, 9 (shown in the drawings as a conveyor having an inclined portion to achieve differing elevations of articles). Conveyor 9 receives articles 11 at article infeed end portion 13, conveys received articles 11 through main conveying portion 15, and then discharges articles 11 at article discharge end portion 17. Cans having the open side facing toward the belt are specifically shown in the drawings as the conveyed articles, but it is meant to be realized that the articles may also be conveyed with the open side facing away from the belt where necessary or desired.

While not being specifically shown, it is also to be realized that infeed, conveying and discharge of articles could be on a common horizontal plane so that the articles are conveyed at the same elevation from infeed end portion 13 to discharge end portion 17, or, in the alternative, main conveying portion, or section, 15 could have a curvature and/or provide for article inversion such as, for example, have a direction reversal along a vertical path so that the articles at discharge are inverted with respect to articles at infeed, and, moreover, that the infeed and discharge end portions could be reversed if the articles are to be brought to a lower elevation, all of which are meant to be included in the term "conveyor" as used herein.

Predetermined, or article, path 19, extends from article infeed end portion 13 to article discharge end portion 17, and is partially established, or defined, by belt 21 having openings 23 therein extending between first and second opposing surfaces 25 and 27 (belt 21 is shown in the drawings as a foraminous belt although other belt-like types of conveying units, such as, for example, a chain having sufficiently wide and spaced links, or slats, might also be used, and such other belt-like types are meant to be included in the term "belt" as used herein). In addition, side rails 29 and/or side enclosures 31 (such as, for example, readily releasable solid Plexiglas sheets as best indicated in FIGS. 1 and 5) and perforated plate 33 are used in conjunction with belt 21 to completely establish, or define, an article path that is closed to the atmosphere except for article infeed and discharge.

Openings 23 in belt 21 are of small diameter compared to that of cylindrical articles, such as cans, normally to be conveyed, with openings 23 being sufficiently close to one another so that at least one opening is under each article conveyed along predetermined path 19 and that additional openings 23 are provided in belt 21 that are not under articles being conveyed along the path. This ensures that,

4 with negative fluid pressure present at the surface of a moving belt opposite to the surface having articles positioned thereon, the articles are drawn toward the belt and fluid is drawn from the articles and/or belt as the articles are moved along the predetermined path by the moving belt.

Belt 21 preferably has sufficient width between the opposite edge portions to accommodate a plurality of articles as is common for mass transport of articles, and belt 21 is preferably an endless belt that extends around rollers 35 and 37 at infeed and discharge sections 13 and 17, respectively, with a plurality of idler and/or tensioning rollers 39 being spaced along the belt return portion (i.e., that portion of the belt not then extending along predetermined path 19). Belt 21 is driven about an endless path by electric motor 41 through sprocket 43, drive belt 45, sprocket 47 and roller 37 so that rotation of roller 37 causes belt 21 to be driven about the endless path at a speed, for example, of about 45 feet per minute.

Chamber, or plenum, 49 is maintained, during normal operation, at a negative fluid pressure of about two and one-half inches of water which has proved to be sufficient to draw articles in predetermined path 19 against belt 21 and to also draw fluid from articles in the predetermined path into chamber 49.

Chamber 49 is preferably closed, or sealed, to the atmosphere or environment by housing 51 except for inlet, or open, first portion 55. Inlet, or top, portion 55 extends along and under predetermined path 19 with belt 21 preferably being between path 19 and inlet portion 55. Inlet portion 55 preferably has a plurality of elongated rods 57 spaced from one another about three to four inches across the width of the predetermined path with the rods extending along the length of the predetermined path so that the rods engage the side of the belt opposite to that in engagement with the articles being transported along predetermined path 19 (at least when negative fluid pressure is present in chamber 49) to draw the belt against the rods so that the rods establish the angle, if any, and/or the curvature, if any, in predetermined article path 19.

Negative fluid pressure is established in chamber 49 by means of pressure source 59, best shown in FIGS. 2 through 4 as including a closed, or sealed, housing 61 having a main portion 63 with a fan, or blower, 65 thereat. Fan 65 is rotatively driven by electric motor 67 through sprocket 69, drive belt 71 and sprocket 73 connected to fan 65. Operation of fan 65 causes air to be drawn into main portion 63 of housing 61 through conduit 77 extending between chamber 49 and pressure source 59. A fluid return portion, or conduit, 79 extends from main portion 63 of pressure source 59 at the side of fan 65 opposite to that of conduit 77 with return portion 79 extending over predetermined path 19 and communicating with path 19 through perforated fluid disperser plate 33 (a second perforated plate spaced a short distance from plate 33 may also be used, as indicated in FIG. 1) to supply positive fluid pressure through plates 33 to article path 19 (path 19 being at, or near, atmospheric pressure) when fan 65 is operating.

Fluid, including air and/or air/liquid mixtures (such as mixtures of air with an oily liquid carried, for example, by newly formed cans when being transported along article path 19) is contained within a closed fluid path to and from article path 19 with the fluid path being established through chamber 49, conduit 77, pressure source 59 and return conduit 79.

Within separating chamber 49, the fluid therein normally includes air and liquid (such as oily liquid, for example, where newly formed cans are being transported) and the liquid can separate from the air by gravity at second, or main, portion 81 of the chamber. As best shown in FIG. 6, gravity separation of liquid from the air is effected at second portion 81 of chamber 49, and as best shown in FIG. 6 in conjunction with FIG. 2, conduit 77 is smaller in size than housing 51 of chamber 49 at main portion 81 and extends into housing 51 at main portion 81. Conduit 77 is curved downwardly within main portion 81 to terminate at end portion 83 directed downwardly and at an angle toward the bottom, or third, portion 85 of chamber 49. End portion 83 may have louvers 87 through which conduit 77 opens into chamber 49.

Fluid drawn into chamber 49 through inlet portion 49 passes around end portion 83 of conduit 77 and separated liquid drops, by gravity, toward the bottom portion 85 of chamber 49 (due to the weight differences between the air and the liquid), while fluid (air and/or air-liquid mixtures where liquid is not then separated from the air) is drawn around and upwardly into air conduit 77.

At the bottom portion 85 of chamber 49, the liquid gravity separated from the air is collected by a collecting receptacle 89 formed by the bottom portion of the chamber, and receptacle 89 is connected with liquid conduit 91 (a tube or pipe) for discharging the liquid. As indicated in FIG. 6, liquid conduit 91 (extending to a reclamation area, for example) has an elbow 93 therein to establish a liquid level in the pipe.

During normal operation with articles being conveyed, or transported, along article path 19 from infeed end portion 13 to discharge end portion 17 through main conveying portion 15, and with fan 61 rotating to establish negative fluid pressure in chamber 49 at one side of article path 19 (and to also establish positive fluid pressure at the other side of path 19 at perforated plate 33 when a closed recycling system is utilized, as is now preferred), moving belt 21 slidingly engages rods 57 at inlet portion 55 of chamber 49, articles 17 are firmly held against belt 21 as the articles are moved along article path 19 (regardless of the orientation of the path), and fluid is drawn from the articles and/or belt and passes through the openings in the belt to chamber 49. Within chamber 49, the fluid is discharged through the fluid conduit and recirculated through the closed fluid recycling system back to path 19. In addition, liquid within chamber 49 can separate by gravity from the air in the chamber with the separated liquid being collected and discharged through the liquid conduit.

As can be appreciated from the foregoing, this invention provides novel article conveying apparatus and method providing containment of fluid, such as air and/or air-liquid mixtures, during transport of articles and is particularly well suited for containing fluids during transport of articles such as cans.

What is claimed is:

1. An apparatus for conveying articles, said apparatus comprising:
   a movable belt for effecting movement of articles along a predetermined path by movement of said belt;
   walls adjacent to said belt and extending along opposite sides of said predetermined article path;
   a chamber having a first portion open to said predetermined article path and a second portion connected with said first portion;
   a return conduit having a discharge portion open to said predetermined article path with said discharge portion being spaced from said first portion of said chamber; and
   a pressure unit connected with said second portion of said chamber and said return conduit for establishing flow of fluid from said return conduit through said predetermined article path and into said chamber at said first portion of said chamber and passed to said second portion of said chamber, said fluid being an air-liquid mixture and said second portion of said chamber including a separator for enabling separation of liquid from said air-liquid mixture with said air-liquid mixture in said apparatus being substantially contained within said apparatus during operation.

2. The apparatus of claim 1 wherein said belt has first and second surfaces with openings extending therebetween, wherein said articles engage said first surface of said belt, and wherein said first portion of said chamber is positioned adjacent to said second surface of said belt.

3. The apparatus of claim 2 wherein said discharge portion of said return conduit includes an apertured plate extending along said predetermined article path and spaced from said belt a distance sufficient to enable articles to be moved along said predetermined article path between said belt and said apertured plate.

4. The apparatus of claim 2 wherein a negative fluid pressure is established in said first portion of said chamber, and wherein said articles moved along said predetermined article path are maintained in engagement with said first surface of said belt by said negative fluid pressure in said first portion of said chamber.

5. The apparatus of claim 4 wherein said predetermined article path is oriented at least in part at an angle with respect to horizontal.

6. The apparatus of claim 1 wherein said separator includes means enabling gravity separation of liquid from said air-liquid mixture in said second portion of said chamber, wherein said chamber includes a third portion providing a collecting receptacle thereat to collect liquid separated from said air-liquid mixture at said second portion of said chamber, and wherein said chamber also includes a pipe connected with said collecting receptacle for enabling discharge of separated liquid from said chamber.

7. The apparatus of claim 1 wherein said liquid includes oily liquid residing at least on said articles, and wherein said oily liquid is separated from said air-liquid mixture in said second portion of said chamber and maintained within said chamber until discharged.

8. The apparatus of claim 1 wherein said pressure unit includes a fan for drawing fluid from said chamber to thereby establish negative fluid pressure within said chamber.

9. The apparatus of claim 1 wherein said pressure unit is connected with said chamber through a conduit extending into said second portion of said chamber.

10. The apparatus of claim 9 wherein said conduit extending into said second portion of said chamber has an end portion extending at least partially in a direction away from said predetermined article path.

11. The apparatus of claim 1 wherein said articles are cans, and wherein said cans are mass transported along said predetermined article path.

12. An apparatus for mass transport of articles, said apparatus comprising:
   a predetermined article path having article infeed and discharge end portions and a main portion extending between said article infeed and discharge portions said main portion being established by substantially solid first and second spaced walls, an apertured wall adjacent to said first and second spaced walls, and a movable belt spaced from said apertured wall and adjacent to said first and second spaced walls, said movable belt having first and second opposing surfaces with said first opposing surface being engagable with articles for moving said articles in mass along said predetermined article path from said article infeed end portion through said main portion to said article discharge portion when said belt is moved along said predetermined article path, and said belt having openings therein extending between said first and second opposing surfaces;

a chamber having first and second portions and a housing that substantially closes said chamber to the atmosphere except at said first portion, said first portion being adjacent to said second opposing surface of said belt and open to said main portion of said predetermined article path through said openings in said belt;

a return conduit connected with said apertured wall at said main portion of said predetermined article path; and a pressure unit connected with said second portion of said chamber for establishing negative fluid pressure at least within said first portion of said chamber when said pressure unit is in operation such that articles in said main portion of said predetermined article path are maintained in engagement with said first opposing surface of said belt and fluid in said main portion of said predetermined article path is drawn into said first portion of said chamber through said openings in said belt and passed to said second portion of said chamber, said pressure unit being connected with said return conduit to supply positive fluid pressure to said main portion of said predetermined article path through said apertured wall when said pressure unit is in operation.

13. The apparatus of claim 12 wherein said fluid includes air and liquid to form an air-liquid mixture, wherein said second portion of said chamber includes means for gravity separation of liquid from said air-liquid mixture, wherein said chamber includes a third portion having a collecting receptacle, and wherein said gravity separated liquid is collected in said collecting receptacle within said third portion of said chamber.

14. The apparatus of claim 13 wherein said articles are cans, and wherein said liquid is an oily liquid residing at least on said cans.

15. The apparatus of claim 12 wherein said pressure unit includes a fan for drawing fluid from said chamber to establish and maintain said negative fluid pressure within said chamber and to supply said positive fluid pressure through said return conduit to said predetermined path.

16. An apparatus for conveying cans having oily liquid thereon, said apparatus comprising:

a movable belt having first and second opposing surfaces with cans having oily liquid thereon engaging said first opposing surface of said belt so that said belt moves said cans along a predetermined path during movement of said belt along said predetermined path, said belt having openings therein extending between said first and second opposing surfaces;

a chamber having a first portion adjacent to said second opposing surface of said belt with said first portion being open to said predetermined path through said openings in said belt, a second portion connected with said first portion, and a housing that substantially closes said chamber to the atmosphere except at said first portion;

a pressure unit having a housing and a fan within said housing;

a first conduit connecting said pressure unit with said second portion of said chamber to establish and maintain a negative fluid pressure within at least said first portion of said chamber when said fan is in operation, said negative fluid pressure in said first portion of said chamber causing articles in said predetermined article path to be maintained in engagement with said first opposing surface of said belt during movement of said belt along said predetermined article path, and said negative fluid pressure in said first portion of said chamber also causing fluid, including oily liquid from said cans as a Part thereof, to be drawn into said first portion of said chamber through said openings in said belt and passed through said second portion of said chamber to said pressure unit; and a second conduit connected between said pressure unit and said predetermined article path to receive said fluid from said pressure unit and discharge said fluid to said predetermined article path to thereby establish a closed fluid recirculation path within said apparatus.

17. The apparatus of claim 16 wherein said belt has opposite side edges, and wherein said apparatus includes a pair of solid plates adjacent to said opposite edges of said belt and extending along a main portion of said predetermined article path and a perforated plate extending along said main portion of said predetermined article path and spaced from said belt a distance sufficient to enable cans to be moved along said predetermined path, said perforated plate being connected with said second conduit, and said plates substantially assuring that said fluid is drawn into said chamber and not released to the atmosphere at said predetermined article path.

18. The apparatus of claim 17 wherein said pressure unit provides positive fluid pressure to said second conduit, and wherein said second conduit connected with said perforated plate at said predetermined path supplies said positive fluid pressure to said predetermined path through said perforated plate.

19. The apparatus of claim 16 wherein said second portion of said chamber includes means enabling gravity separation of said oily liquid from said fluid, and wherein said chamber has a third portion with a collecting receptacle for collecting oily liquid separated from said fluid at said second portion of said chamber and a pipe connected with said collecting receptable to effect discharge of said separated oily liquid from said chamber.

20. The apparatus of claim 19 wherein said pipe has an elbow therein to establish a liquid level in said pipe.

* * * * *